United States Patent
Naik et al.

(10) Patent No.: US 11,894,029 B1
(45) Date of Patent: Feb. 6, 2024

(54) SPIKING NEURAL NETWORK HARDWARE BASED ON MAGNETIC-TUNNEL-JUNCTION LAYER STACKS

(71) Applicant: GlobalFoundries Singapore Pte. Ltd., Singapore (SG)

(72) Inventors: Vinayak Bharat Naik, Singapore (SG); Joel Tan, Singapore (SG); Jia Hao Lim, Singapore (SG); Kazutaka Yamane, Singapore (SG)

(73) Assignee: GlobalFoundries Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/974,790

(22) Filed: Oct. 27, 2022

(51) Int. Cl.
*G11B 5/39* (2006.01)
(52) U.S. Cl.
CPC ..................... *G11B 5/39* (2013.01)
(58) Field of Classification Search
None
See application file for complete search history.

(56) References Cited

U.S. PATENT DOCUMENTS

| | | | | |
|---|---|---|---|---|
| 7,397,638 B2 * | 7/2008 | Gill | | G11B 5/3932 360/324.12 |
| 9,548,446 B2 | 1/2017 | Park et al. | | |
| 10,607,674 B2 | 3/2020 | Camsari et al. | | |
| 10,922,608 B2 | 2/2021 | Suda et al. | | |
| 2005/0185455 A1 * | 8/2005 | Huai | | B82Y 40/00 365/171 |
| 2006/0002042 A1 * | 1/2006 | Gill | | G11B 5/1278 |
| 2006/0098352 A1 * | 5/2006 | Gill | | G11B 5/3932 360/324.1 |
| 2007/0019340 A1 * | 1/2007 | Gill | | G11B 5/3932 360/324.11 |
| 2007/0019342 A1 * | 1/2007 | Gill | | G11B 5/3932 360/324.12 |
| 2013/0077390 A1 * | 3/2013 | Lombard | | G11C 11/161 365/158 |
| 2016/0379110 A1 | 12/2016 | Eleftheriou et al. | | |
| 2019/0088713 A1 * | 3/2019 | Swerts | | H10N 50/10 |

(Continued)

FOREIGN PATENT DOCUMENTS

| | | | | |
|---|---|---|---|---|
| EP | 2736045 A1 * | 5/2014 | | G11C 11/16 |
| EP | 2760025 A1 * | 7/2014 | | G11C 11/16 |

OTHER PUBLICATIONS

M.- H. Wu et al., "Extremely Compact Integrate-and-Fire STT-MRAM Neuron: A Pathway toward All-Spin Artificial Deep Neural Network," 2019 Symposium on VLSI Technology, pp. T34-T35, doi: 10.23919/VLSIT.2019.8776569 (2019).

(Continued)

*Primary Examiner* — William J Klimowicz
(74) *Attorney, Agent, or Firm* — Thompson Hine LLP

(57) ABSTRACT

Structures including a magnetic-tunnel-junction layer stack and methods of forming such structures. The structure comprises a magnetic-tunneling-junction layer stack including a reference layer, an antiferromagnetic layer, a free layer positioned between the reference layer and the antiferromagnetic layer, and a tunnel barrier layer positioned between the reference layer and the free layer. The antiferromagnetic layer has a static magnetic field with a magnetization, and the antiferromagnetic layer is antiferromagnetically coupled to the free layer.

20 Claims, 4 Drawing Sheets

(56) References Cited

U.S. PATENT DOCUMENTS

2019/0295617 A1* 9/2019 Wang ............... H01F 10/3272
2021/0150317 A1  5/2021 Hou et al.

OTHER PUBLICATIONS

F.-X. Liang, P. Sahu, M.-H. Wu, J.-H. Wei, S. S. Sheu and T.-H. Hou, "Stochastic STT-MRAM Spiking Neuron Circuit," 2020 International Symposium on VLSI Technology, Systems and Applications (VLSI-TSA), pp. 151-152, doi: 10.1109/VLSI-TSA48913.2020.9203701 (2020).

Fu-Xiang Liang et al., "Progress and Benchmark of Spiking Neuron Devices and Circuits," Advanced Intelligent Systems, vol. 3, Issue 8 https://doi.org/10.1002/aisy.202100007; pp. 1-13 (2021).

Kwabena Boahen, "A Neuromorph's Prospectus," The End of Moore's Law, Computing in Science & Engineering, 1521-9615/17, pp/ 14-28 (Mar.-Apr. 2017).

J. Tan et al., "Role of temperature, MTJ size and pulse-width on STT-MRAM bit-error rate and backhopping," Solid-State Electronics, vol. 183, https://doi.org/10.1016/j.sse.2021.108032, pp. 1-5 (Sep. 2021).

Pei, J., Deng, L., Song, S. et al. Towards artificial general intelligence with hybrid Tianjic chip architecture, Nature 572, 106-111, https://doi.org/10.1038/s41586-019-1424-8 (2019).

* cited by examiner

SPIKING NEURAL NETWORK HARDWARE BASED ON MAGNETIC-TUNNEL-JUNCTION LAYER STACKS

BACKGROUND

The present disclosure relates to integrated circuits and semiconductor device fabrication and, more specifically, to structures including a magnetic-tunnel-junction layer stack and methods of forming such structures.

A neural network is a system of hardware and/or software patterned after the operation of neurons in the human brain. A spiking neural network is a type of neural network that operates using spikes, which are discrete events that take place at points in time, rather than continuous values. Essentially, a neuron spikes after reaching a sufficiently high potential, after which the potential of that neuron is reset.

Improved structures including a magnetic-tunnel-junction layer stack and methods of forming such structures are needed.

SUMMARY

According to an embodiment of the invention, a structure comprises a magnetic-tunneling-junction layer stack including a reference layer, an antiferromagnetic layer, a free layer positioned between the reference layer and the antiferromagnetic layer, and a tunnel barrier layer positioned between the reference layer and the free layer. The antiferromagnetic layer has a static magnetic field with a magnetization, and the antiferromagnetic layer is antiferromagnetically coupled to the free layer.

According to an embodiment of the invention, a method comprises forming a magnetic-tunneling-junction layer stack including a reference layer, an antiferromagnetic layer, a free layer positioned between the reference layer and the antiferromagnetic layer, and a tunnel barrier layer positioned between the reference layer and the free layer. The antiferromagnetic layer has a static magnetic field with a magnetization, and the antiferromagnetic layer is antiferromagnetically coupled to the free layer.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
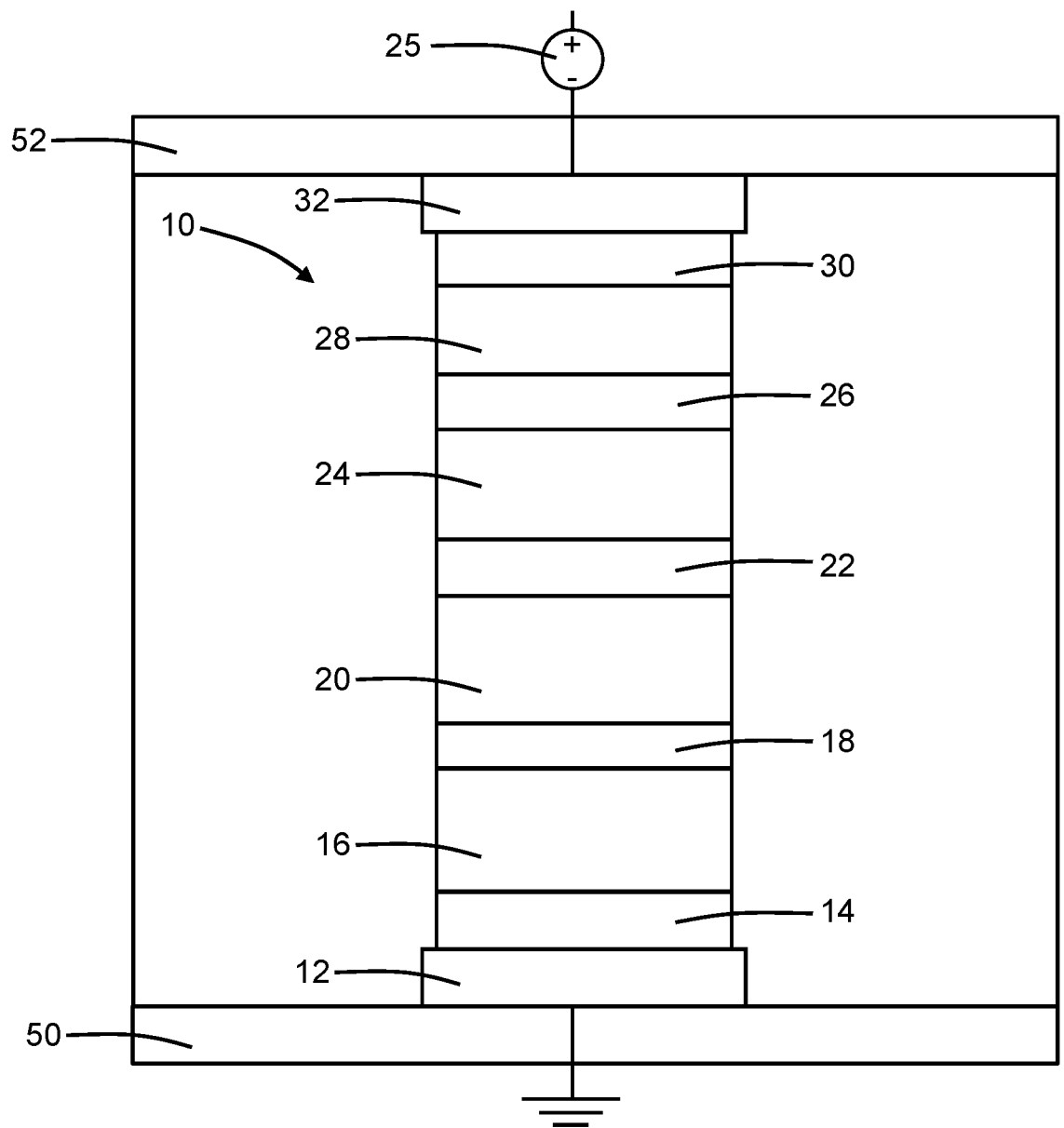
FIG. 1 is a cross-sectional view of a magnetic-tunnel-junction layer stack in accordance with embodiments of the invention.

With reference to FIG. 1 and in accordance with embodiments of the invention, a magnetic-tunneling-junction layer stack 10 includes a bottom electrode 12, a seed layer 14, an antiferromagnetic layer 16, an antiferromagnetic coupling layer 18, a reversible free layer 20, a tunnel barrier layer 22, a reference layer 24, a ferromagnetic coupling layer 26, a hard magnetic layer 28, a cap layer 30, and a top electrode 32. The layers of the magnetic-tunneling-junction layer stack 10 may be sequentially formed with a stacked arrangement by one or more deposition processes, such as physical vapor deposition processes, and patterned.

The magnetic-tunneling-junction layer stack 10 may be located between wiring levels 50, 52 of an interconnect structure fabricated by back-end-of-line processes. The wiring levels 50, 52 of the interconnect structure may be formed by deposition, polishing, lithography, and etching techniques characteristic of a damascene process. Specifically, for each of the wiring levels 50, 52, one or more dielectric layers may be deposited and patterned using lithography and etching processes to define trenches and via openings that are lined with a barrier layer and filled by a planarized metal to define metallization. Each dielectric layer may be comprised of a dielectric material, such as silicon dioxide or a low-k dielectric material, and the metallization may be comprised of, for example, copper or aluminum. The bottom electrode 12 may be coupled to ground by metallization in the wiring level 50, and the top electrode 32 may be coupled to a voltage source 25 through by metallization in the wiring level 52.

The bottom electrode 12 may be comprised of a conductor, such as tantalum or tantalum nitride. The seed layer 14, which is positioned on the bottom electrode 12, may enable a smooth and densely-packed deposition and growth of the subsequently-formed layers of the magnetic-tunneling-junction layer stack 10. To that end, the seed layer 14 may be comprised of a metal, such as ruthenium or tantalum, that is intended to reduce surface roughness.

The antiferromagnetic layer 16 is positioned on the seed layer 14, the antiferromagnetic coupling layer 18 is positioned on the antiferromagnetic layer 16, and the reversible free layer 20 is positioned on the antiferromagnetic coupling layer 18. The antiferromagnetic layer 16 may be comprised of a magnetic material, such as multiple bilayers of cobalt and palladium or multiple bilayers of cobalt and platinum. The reversible free layer 20 may be comprised of a magnetic material, such as a cobalt-iron-boron alloy. The antiferromagnetic coupling layer 18 may be comprised of a metal, such a ruthenium or iridium, that is non-magnetic and that can be configured to adjust the coupling strength of the antiferromagnetic coupling layer 18 with the reversible free layer 20. In an embodiment, the reversible free layer 20 may directly contact the antiferromagnetic coupling layer 18, and the antiferromagnetic coupling layer 18 may directly contact the antiferromagnetic layer 16.

The tunnel barrier layer 22 is positioned on the reversible free layer 20. The tunnel barrier layer 22 may be comprised of a non-magnetic and electrically-insulating dielectric material, such as magnesium oxide. The reference layer 24 is positioned on the tunnel barrier layer 22 and is separated from the reversible free layer 20 by the tunnel barrier layer 22. The reference layer 24 may be comprised of a magnetic material, such as a cobalt-iron-boron alloy. The ferromagnetic coupling layer 26 is positioned on the reference layer 24. The ferromagnetic coupling layer 26 may be comprised of a metal, such as tantalum or tungsten, that is non-magnetic.

The hard magnetic layer 28 is positioned on the ferromagnetic coupling layer 26. The hard magnetic layer 28 may be comprised of a magnetic material, such as multiple bilayers of cobalt and palladium or multiple bilayers of cobalt and platinum. The ferromagnetic coupling layer 26 can be configured through, for example, a selection of thickness to adjust the coupling strength of the ferromagnetic coupling layer 26 with the reference layer 24. In an embodiment, the hard magnetic layer 28 may directly contact the ferromagnetic coupling layer 26, and the ferromagnetic coupling layer 26 may directly contact the reference layer 24. The cap layer 30 is positioned on the hard magnetic layer 28. The cap layer 30 may be comprised of a metal, such as tantalum or ruthenium. The top electrode 32, which is positioned on the cap layer 30, may be comprised of a conductor, such as tantalum or tantalum nitride.

The antiferromagnetic layer 16 is characterized by a pinned or static magnetic field with a magnetization that is antiparallel to the magnetization of the reference layer 24. The reference layer 24 and the hard magnetic layer 28 are characterized by pinned or static magnetic fields with magnetizations that are antiparallel to the magnetization of the antiferromagnetic layer 16. The reversible free layer 20 has a magnetization that may be switched between a state that is parallel to the magnetization of the reference layer 24 and a state that is antiparallel to the magnetization of the reference layer 24 to respectively provide low-resistance and high-resistance states. The reversible free layer 20 is antiferromagnetically coupled with the antiferromagnetic layer 16. As a result, the switching of the reversible free layer 20 is resisted by the antiferromagnetic layer 16 and, after switching, the reversible free layer 20 is assisted by the antiferromagnetically coupling with the antiferromagnetic layer 16 to return (i.e., back hop) to its initial state.

In use, a voltage is applied from the voltage source 25 to the magnetic-tunneling-junction layer stack 10 that induces spikes and a resistance state change. Generally, the applied voltage to induce a spike is greater than the voltage normally applied to a magnetic-tunneling-junction layer stack in a magnetoresistive random access memory device to cause switching. The magnetization of the reversible free layer 20 is susceptible to back-hopping, which results in reversible switching in a device structure suitable for use in spiking neural network hardware. The antiferromagnetic coupling between the reversible free layer 20 and the antiferromagnetic layer 16 may reduce the voltage at which switching and back-hopping occurs. The voltage reduction may, among other benefits, lengthen the lifetime of the tunnel barrier layer 22 and increase the endurance and reliability of the magnetic-tunneling-junction layer stack 10 when deployed in spiking neural network hardware.

Figure 2:
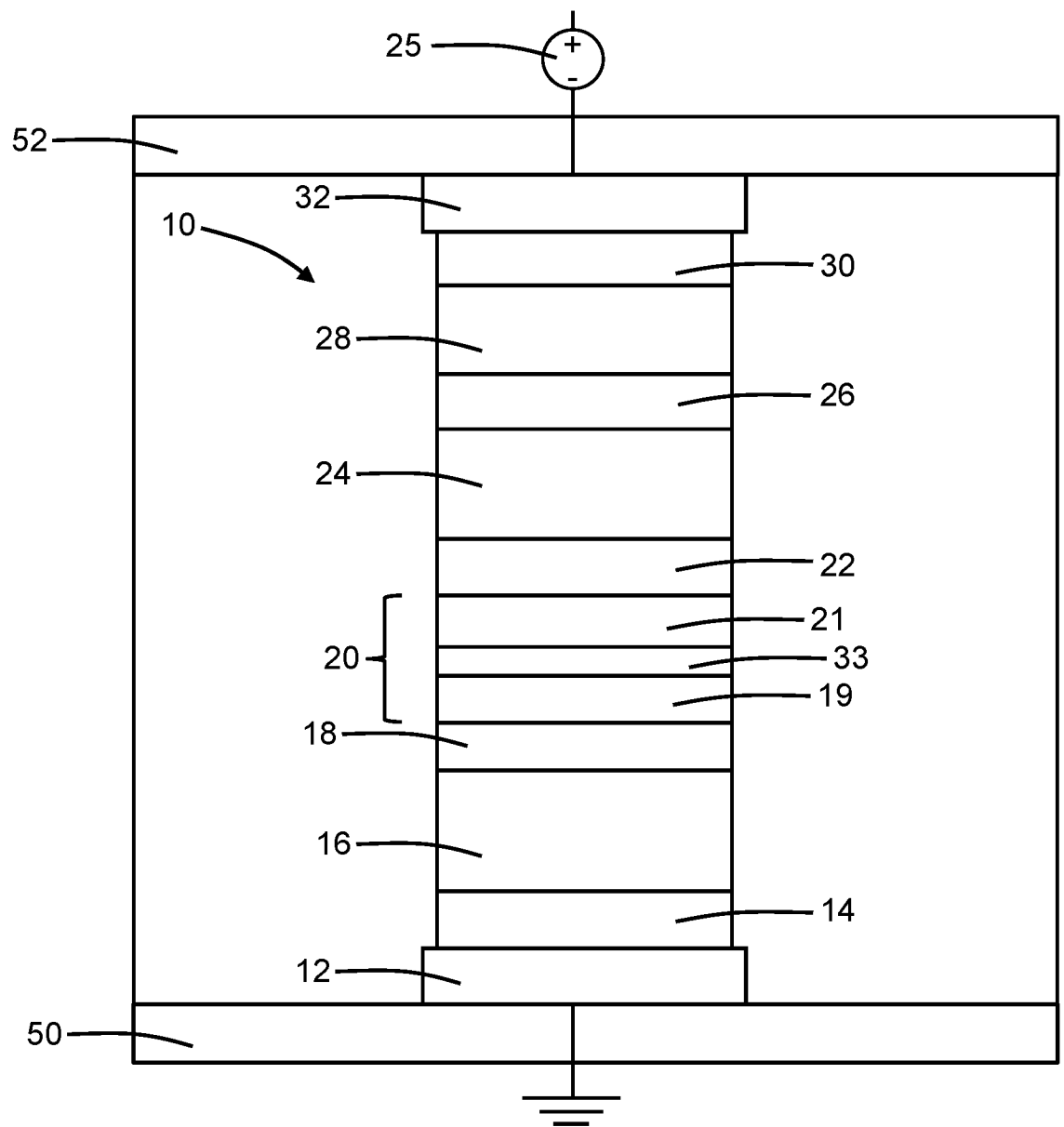
FIG. 2 is a cross-sectional view of a magnetic-tunnel-junction layer stack in accordance with alternative embodiments of the invention.

With reference to FIG. 2 in which like reference numerals refer to like features in FIG. 1 and in accordance with alternative embodiments, the reversible free layer 20 may include a free layer section 19, a free layer section 21 that is stacked with the free layer section 19, and a spacer layer 33 comprised of ruthenium or iridium that is positioned between the free layer section 19 and the free layer section 21. Due to the proximity of the free layer section 21 to the hard magnetic layer 28, the free layer section 21 is pinned and does not switch during spiking. However, the free layer section 19 closer to the antiferromagnetic layer 16 is able to switch and reverse switch due to back-hopping with resistance and assistance, respectively, from the anti-ferromagnetic coupling between the free layer section 19 and the antiferromagnetic layer 16.

Figure 3:
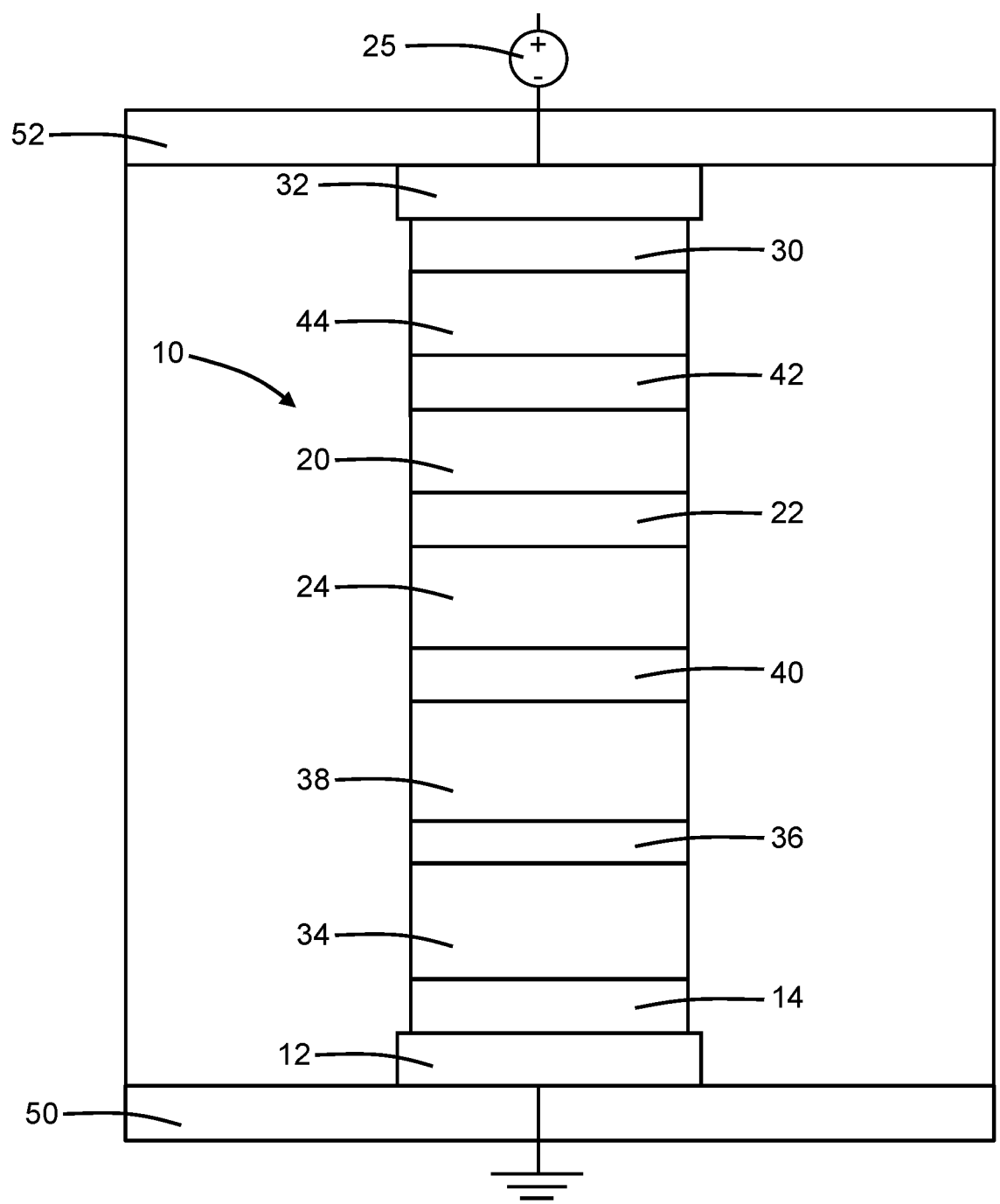
FIG. 3 is a cross-sectional view of a magnetic-tunnel-junction layer stack in accordance with alternative embodiments of the invention.

With reference to FIG. 3 in which like reference numerals refer to like features in FIG. 1 and in accordance with alternative embodiments, the magnetic-tunneling-junction layer stack 10 may include an antiferromagnetic layer 34, an antiferromagnetic coupling layer 36, an antiferromagnetic layer 38, and a ferromagnetic coupling layer 40 that are arranged between the seed layer 14 and the reference layer 24. The antiferromagnetic layer 34 and the antiferromagnetic layer 38 may be polarized to have opposite directions of magnetization, and the antiferromagnetic coupling layer 36 may function to promote pinning of the magnetizations of the antiferromagnetic layers 34, 38. The antiferromagnetic layers 34, 38 may be comprised of a magnetic material, such as multiple bilayers of cobalt and palladium or multiple bilayers of cobalt and platinum. The antiferromagnetic coupling layer 36 may be comprised of a non-magnetic material, such as ruthenium or iridium. The ferromagnetic coupling layer 40 may be comprised of a metal, such as tantalum or tungsten.

The reference layer 24 is positioned in a vertical direction between the reversible free layer 20 and the ferromagnetic coupling layer 40. The tunnel barrier layer 22 is positioned in a vertical direction between the reversible free layer 20 and the reference layer 24. The magnetic-tunneling-junction layer stack 10 further includes an antiferromagnetic coupling layer 42 that is positioned on the reversible free layer 20 and an antiferromagnetic layer 44 that is positioned on the antiferromagnetic coupling layer 42. The antiferromagnetic coupling layer 42 is positioned in a vertical direction between the antiferromagnetic layer 44 and the reversible free layer 20. In an embodiment, the reversible free layer 20 may directly contact the antiferromagnetic coupling layer 42, and the antiferromagnetic layer 44 may directly contact the antiferromagnetic coupling layer 42.

The antiferromagnetic coupling layer 42 may be comprised of ruthenium or iridium, and the antiferromagnetic layer 44 may be comprised of a magnetic material, such as multiple bilayers of cobalt and palladium or multiple bilayers of cobalt and platinum. The antiferromagnetic layer 44 has a static magnetic field with a magnetization that is parallel to the magnetization of the reference layer 24. The antiferromagnetic layer 44 provides the antiferromagnetic coupling with the reversible free layer 20 that may reduce the voltage at which back-hopping occurs.

Figure 4:
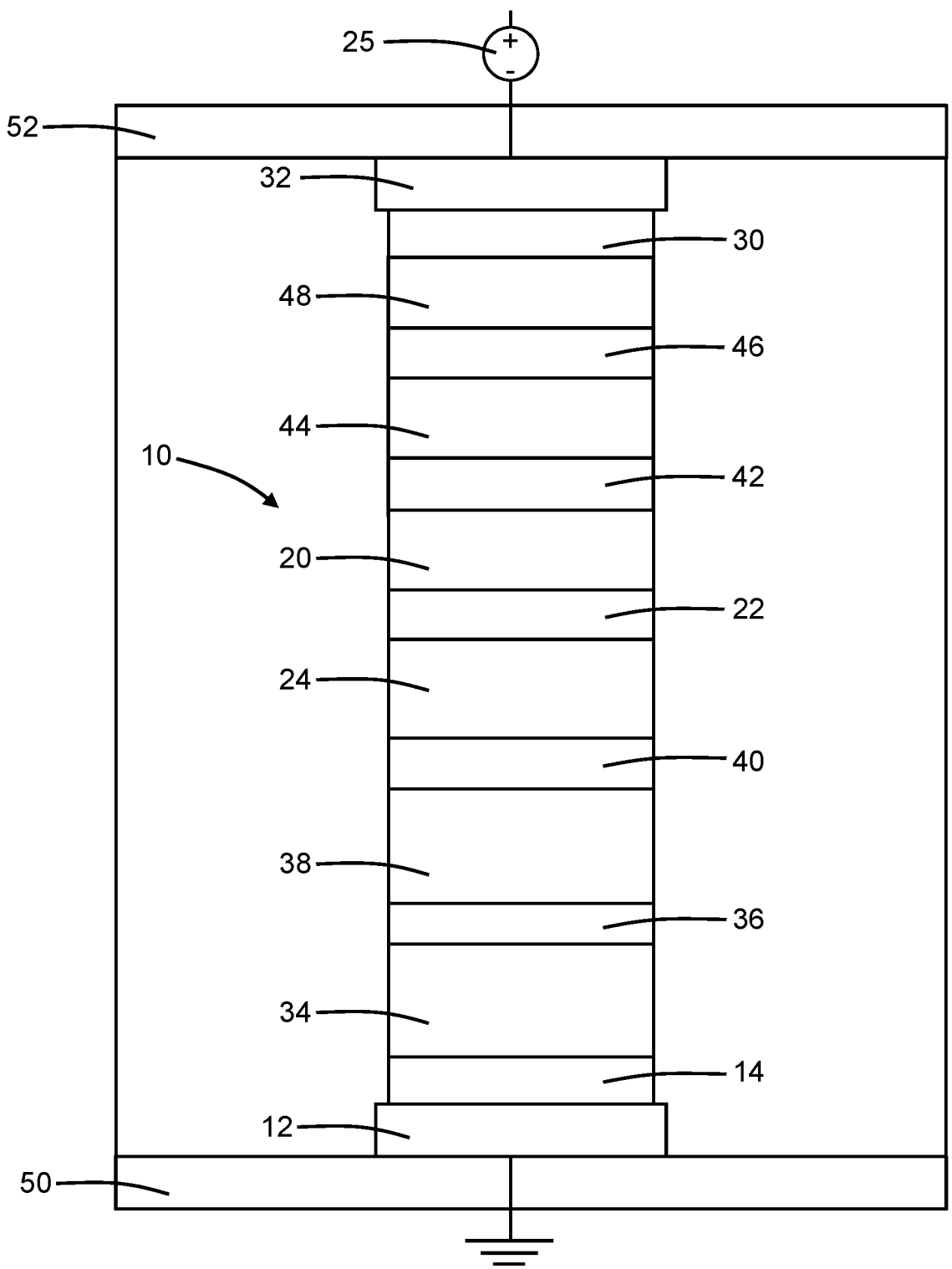
FIG. 4 is a cross-sectional view of a magnetic-tunnel-junction layer stack in accordance with alternative embodiments of the invention.

With reference to FIG. 4 in which like reference numerals refer to like features in FIG. 3 and in accordance with alternative embodiments, a ferromagnetic coupling layer 46 and an antiferromagnetic layer 48 may be added to the layers of the magnetic-tunneling-junction layer stack 10. The ferromagnetic coupling layer 46 and antiferromagnetic layer 48 are positioned in the magnetic-tunneling-junction layer stack 10 between the antiferromagnetic layer 44 and the cap layer 30 with the ferromagnetic coupling layer 46 between the antiferromagnetic layer 48 and the antiferromagnetic layer 44. The antiferromagnetic layer 48 may be comprised of a magnetic material, such as multiple bilayers of cobalt and palladium or multiple bilayers of cobalt and platinum, and the ferromagnetic coupling layer 46 may be comprised of a metal, such as ruthenium or iridium, that is non-magnetic. The antiferromagnetic layer 48 is ferromagnetically coupled with the antiferromagnetic layer 44 and has a static magnetic field with a magnetization that is parallel to the magnetization of the antiferromagnetic layer 44. The anisotropic field (Hk) provided by the antiferromagnetic layer 48 may boost the resistance of the antiferromagnetic layer 44 to unwanted switching.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/− 10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a magnetic-tunneling-junction layer stack including a reference layer, a first antiferromagnetic layer comprising a plurality of bilayers of cobalt and palladium or a plurality of bilayers of cobalt and platinum, a free layer positioned between the reference layer and the first antiferromagnetic layer, and a tunnel barrier layer positioned between the reference layer and the free layer, the first antiferromagnetic layer having a static magnetic field with a magnetization, the first antiferromagnetic layer being antiferromagnetically coupled to the free layer, and the reference layer having a static magnetic field with a magnetization antiparallel to the magnetization of the first antiferromagnetic layer, wherein the free layer has a magnetization with a first state and a second state that differs from the first state, the first antiferromagnetic layer is configured to resist switching of the free layer from the first state to the second state, and the first antiferromagnetic layer is configured to assist switching of the free layer from the second state to the first state.

2. The structure of claim 1 wherein the magnetic-tunneling-junction layer stack includes a hard magnetic layer adjacent to the reference layer, and the hard magnetic layer has a static magnetic field with a magnetization parallel to the magnetization of the reference layer.

3. The structure of claim 2 wherein the free layer includes a first section, a second section stacked with the first section, and a coupling layer between the first section and the second section, the first section of the free layer is positioned adjacent to the reference layer and the hard magnetic layer, and the second section of the free layer is positioned adjacent to the first antiferromagnetic layer.

4. The structure of claim 2 wherein the magnetic-tunneling-junction layer stack includes a ferromagnetic coupling layer between the hard magnetic layer and the reference layer.

5. The structure of claim 2 wherein the magnetic-tunneling-junction layer stack includes an antiferromagnetic coupling layer between the first antiferromagnetic layer and the free layer.

6. The structure of claim 1 wherein the magnetic-tunneling-junction layer stack includes a second antiferromagnetic layer adjacent to the first antiferromagnetic layer, and the second antiferromagnetic layer has a static magnetic field with a magnetization parallel to the magnetization of the first antiferromagnetic layer.

7. The structure of claim 6 wherein the magnetic-tunneling-junction layer stack includes an antiferromagnetic coupling layer between the first antiferromagnetic layer and the free layer, and the magnetic-tunneling-junction layer stack includes a ferromagnetic coupling layer between the first antiferromagnetic layer and the free layer.

8. The structure of claim 1 wherein the magnetic-tunneling-junction layer stack includes an electrode and a seed layer on the electrode, and the first antiferromagnetic layer is positioned between the free layer and the electrode.

9. The structure of claim 8 wherein the free layer is positioned between the reference layer and the electrode.

10. The structure of claim 1 wherein the magnetic-tunneling-junction layer stack includes an electrode and a seed layer on the electrode, and the free layer is positioned between the first antiferromagnetic layer and the electrode.

11. The structure of claim 10 wherein the reference layer is positioned between the free layer and the electrode.

12. The structure of claim 1 wherein the magnetic-tunneling-junction layer stack includes an antiferromagnetic coupling layer between the first antiferromagnetic layer and the free layer.

13. The structure of claim 12 wherein the antiferromagnetic coupling layer directly contacts the first antiferromagnetic layer, and the antiferromagnetic coupling layer directly contacts the free layer.

14. The structure of claim 1 wherein the magnetic-tunneling-junction layer stack includes an electrode, a seed layer on the electrode, a second antiferromagnetic layer, and a third antiferromagnetic layer, and the second antiferromagnetic layer and the third antiferromagnetic layer are positioned between the free layer and the electrode.

15. The structure of claim 1 wherein the free layer includes a first section, a second section stacked with the first section, and a coupling layer between the first section and the second section, the first section of the free layer is positioned adjacent to the reference layer, and the second section of the free layer is positioned adjacent to the first antiferromagnetic layer.

16. The structure of claim 1 further comprising:
a spiking neural network including the magnetic-tunneling-junction layer stack.

17. The structure of claim 1 wherein the magnetic-tunneling-junction layer stack includes an electrode, and further comprising:
a voltage source coupled to the electrode,
wherein the voltage source is configured to apply a voltage to the electrode that causes the free layer to switch from the first state to the second state, and the free layer is configured to back-hop from the second state to the first state assisted by the first antiferromagnetic layer.

18. A method comprising:
forming a magnetic-tunneling-junction layer stack including a reference layer, an antiferromagnetic layer comprising a plurality of bilayers of cobalt and palladium or a plurality of bilayers of cobalt and platinum, a free layer positioned between the reference layer and the antiferromagnetic layer, and a tunnel barrier layer positioned between the reference layer and the free layer,
wherein the antiferromagnetic layer has a static magnetic field with a magnetization, the reference layer has a static magnetic field with a magnetization antiparallel to the magnetization of the antiferromagnetic layer, the antiferromagnetic layer is antiferromagnetically coupled to the free layer, the free layer has a magnetization with a first state and a second state that differs from the first state, the antiferromagnetic layer is configured to resist switching of the free layer from the first state to the second state, and the antiferromagnetic layer is configured to assist switching of the free layer from the second state to the first state.

19. The method of claim 18 wherein the free layer includes a first section, a second section stacked with the first section, and a coupling layer between the first section and the second section, the first section of the free layer is positioned adjacent to the reference layer, and the second section of the free layer is positioned adjacent to the antiferromagnetic layer.

20. The method of claim 18 wherein the magnetic-tunneling-junction layer stack includes an electrode, and further comprising:
coupling a voltage source to the electrode,
wherein the voltage source is configured to apply a voltage to the electrode that causes the free layer to switch from the first state to the second state, and the free layer is configured to back-hop from the second state to the first state assisted by the antiferromagnetic layer.

* * * * *